United States Patent
Viviant et al.

(10) Patent No.: US 9,166,389 B2
(45) Date of Patent: Oct. 20, 2015

(54) ASSEMBLY COMPRISING A RACEWAY AND A BRANCHING DEVICE, AND ASSOCIATED BRANCHING DEVICE

(75) Inventors: Yannick Viviant, Blagnac (FR); Johann Rouaix, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 381 days.

(21) Appl. No.: 13/597,018

(22) Filed: Aug. 28, 2012

(65) Prior Publication Data
US 2013/0075153 A1 Mar. 28, 2013

(30) Foreign Application Priority Data
Aug. 30, 2011 (FR) ...................... 11 02632

(51) Int. Cl.
| | |
|---|---|
| H02B 1/40 | (2006.01) |
| H02G 3/08 | (2006.01) |
| H02G 3/22 | (2006.01) |
| H02G 3/34 | (2006.01) |
| H02G 3/32 | (2006.01) |
| H02G 3/30 | (2006.01) |
| H02G 3/04 | (2006.01) |
| H02G 3/06 | (2006.01) |

(52) U.S. Cl.
CPC .............. *H02G 3/32* (2013.01); *H02G 3/0418* (2013.01); *H02G 3/0437* (2013.01); *H02G 3/0608* (2013.01); *H02G 3/30* (2013.01)

(58) Field of Classification Search
CPC ....... H02G 3/0608; H02G 3/105; H02G 3/22; H02G 3/0418; B60R 16/0215
USPC .................. 174/481, 503, 505–507
See application file for complete search history.

(56) References Cited

U.S. PATENT DOCUMENTS

| | | | | |
|---|---|---|---|---|
| 3,968,322 A | * | 7/1976 | Taylor | 174/72 A |
| 4,044,428 A | * | 8/1977 | Kowalski | 24/16 R |
| 4,136,257 A | * | 1/1979 | Taylor | 174/68.3 |
| 4,156,795 A | * | 5/1979 | Lacan | 174/97 |
| 4,366,341 A | | 12/1982 | van Riet | |
| 4,542,871 A | * | 9/1985 | Fortsch | 248/73 |

(Continued)

FOREIGN PATENT DOCUMENTS

| | | |
|---|---|---|
| DE | 30 27 693 | 3/1981 |
| WO | 02/31549 | 4/2002 |

OTHER PUBLICATIONS

French Search Report dated Apr. 3, 2012.

*Primary Examiner* — Timothy Thompson
*Assistant Examiner* — Sherman Ng
(74) *Attorney, Agent, or Firm* — Dickinson Wright PLLC

(57) ABSTRACT

The invention essentially relates to an assembly (11) comprising:
a raceway (12) comprising one or more channels (13) intended to receive a harness or harnesses (16) comprising bundles of electrical cables, and
a branching device (14) routing a branch (15) that extends outside the raceway (12) and comes from a bundle located in a channel (13) of the raceway (12),
characterized in that the branching device (14) comprises:
a system for fastening (17) said branching device on the channel (13) containing the bundle from which the branch (15) comes, and
a retention system (18) immobilizing the branch (15) relative to the branching device; this retention system (18) is laterally clear so that, in a top view, it is located outside the channel to which the fastening system is attached.

9 Claims, 4 Drawing Sheets

(56) References Cited

U.S. PATENT DOCUMENTS

| | | | |
|---|---|---|---|
| 4,723,749 A * | 2/1988 | Carraro et al. | 248/317 |
| 5,316,244 A * | 5/1994 | Zetena, Jr. | 248/49 |
| 5,354,020 A * | 10/1994 | Richards | 248/68.1 |
| 5,394,502 A | 2/1995 | Caron | |
| 5,511,349 A * | 4/1996 | Kelley et al. | 52/287.1 |
| 6,192,181 B1 * | 2/2001 | Haataja et al. | 385/136 |
| 2006/0011381 A1 * | 1/2006 | Zeuner et al. | 174/154 |
| 2008/0078891 A1 * | 4/2008 | Hobson | 248/74.2 |
| 2010/0139948 A1 | 6/2010 | Smallhorn | |
| 2011/0198465 A1 * | 8/2011 | Blanchard et al. | 248/226.11 |

* cited by examiner

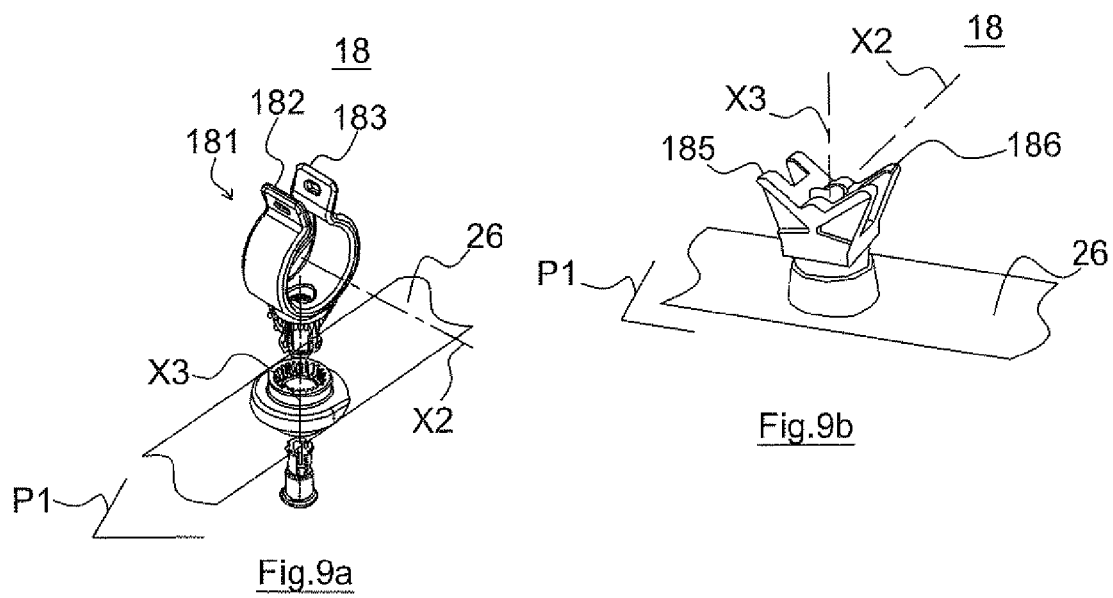

ASSEMBLY COMPRISING A RACEWAY AND A BRANCHING DEVICE, AND ASSOCIATED BRANCHING DEVICE

TECHNICAL FIELD OF THE INVENTION

The invention belongs to the field of cable bundle and electrical harness installation.

The invention relates more specifically to an assembly comprising a raceway and a branching device, and also to the associated branching device.

The invention finds a particularly advantageous application in the field of vehicles subjected to high vibration environments, such as aircraft.

STATE OF THE ART

In an aircraft, connections between electrical equipment are realized by harnesses, each formed of bundles of electrical cables.

The electrical cables, which distribute electrical power or transmit signals, must be perfectly secured and protected, firstly from electromagnetic radiation emitted by neighboring cables that may adversely affect the operation of the equipment to which they are connected, and secondly from mechanical attacks likely to damage the insulation and, directly or indirectly, the conductive portions of the cables.

In aircraft with a mainly metal structure, the cables are protected from electromagnetic radiation by the metal structure and by adopting separation distances between cable runs assigned to categories of cables that must be protected. In addition, the cables are secured on the structure by mounts and mounting clips arranged to prevent the cables from being in contact with the metal structure and thus avoid damage by rubbing as a result of vibrations.

When the structure is made from composites—a solution used increasingly today to benefit from the mass and resilience advantages of these materials, such as the main structure of the Airbus A350 (registered trademark) fuselage, for example—fulfilling the requirements for protecting electrical installations is more difficult than in an electrically conductive environment, insofar as the structure does not have the electrical conduction properties of metal structures nor, therefore, "natural" shielding with respect to electromagnetic interference between harnesses.

To overcome the problems of interference, raceways 1 made of an electrically conductive material, shown in FIGS. 1 and 2, are used, especially in structures made of composites. These raceways 1 comprise grooves or channels 3 inside which the harnesses are positioned. These raceways 1, which comprise two or four channels for example, thus act as Faraday cages by confining the radiation of the cables placed in them and protecting them from external radiation.

In the frequent case in which an item of equipment with electrical connections must be connected to an electrical harness at an intermediate point between a raceway's extremities, the harness, or one of the harness's bundles, must be taken out of the channel in which it runs to bring it to the item of equipment to be connected. The portion of the harness that extends outside the channel to the equipment to be connected is called a branch 4. Branches 4 must be installed so that the electrical cables of these branches are not damaged during the airplane's operation, in particular due to levels of vibration that may be high in certain phases, such as the take-off or landing phase, or in certain areas of the airplane, such as areas close to the engines for example. In effect, a cable's physical contact with a structure or an element that might be damaging with regard to the cable insulation, may lead to wear and the occurrence of a fault in the cable as a result of vibrations and deformations of the structures, which would subsequently require a harness repair that would be costly and detrimental to the aircraft's operation.

To avoid damage to the branch at the raceway, it is known to use branching devices 5, shown in FIG. 2, attached to the raceway 1. These devices 5 allow the bundle to be brought clear of the raceway 1, while avoiding contact between the cables and the raceway as far as possible.

However, for relatively rigid bundles having a large diameter with respect to the width of the channels 3, the existing devices 5 have the disadvantage of being unable to simply avoid contacts between the raceway walls and the cables. In effect, as shown in the case illustrated in FIG. 2, the harness is in contact with the inside surface of one of the raceway walls; this potentially generates wear on the cables of the harness that may lead to an electrical insulation fault, reference 6.

SUBJECT OF THE INVENTION

The invention aims to remedy at least one of these disadvantages.

To this end the branching device is fastened onto the channel containing the harness from which the branch comes. In addition, the branching device comprises a retention system, which is laterally clear relative to the channel to which the branching device is attached. The retention system is configured so as to immobilize the bundle relative to the branching device.

The invention thus relates to an assembly comprising:
a raceway comprising one or more channels intended to receive a harness or harnesses comprising bundles of electrical cables, and
a branching device routing a branch that extends outside the raceway and comes from a bundle located in a channel of the raceway,
characterized in that the branching device comprises:
a system for fastening said branching device on the channel containing the bundle from which the branch comes, and
a retention system immobilizing the branch relative to the branching device;
this retention system is laterally clear so that, in a top view, it is located outside the channel to which the fastening system is attached.

According to a realization, the retention system is positioned above a channel adjacent to the channel on which the branching device is fastened.

Alternatively, when the device is fastened onto an end channel of the raceway, i.e. a channel having only one adjacent channel, or onto a raceway with only one channel, the retention system is positioned outside said raceway, seen from above.

According to a realization, the branching device comprises two arms separated from each other, equipped with the fastening system; these arms extend substantially transversally relative to a longitudinal direction of the channel containing the bundle from which the branch comes; these two arms are connected to each other by means of a connecting bracket; the retention system is installed on the connecting bracket.

According to a realization, a gap between the two arms depends on the diameter of the branch.

According to a realization, the retention system has an axis of symmetry extending in a plane substantially parallel to a base of the raceway. In a variant, the retention system's axis of symmetry can, of course, not be parallel to the base of the raceway.

According to a realization, the branching device also comprises a protective lip designed to cover the edge of a wall of a channel substantially over a length separating the arms.

According to a realization, where the retention system is connected to the connecting bracket via a through-bolt, it comprises a protective device covering one extremity of the bolt so as to avoid damaging a cable of a bundle in the channel above which the branching device is positioned.

According to a realization, the retention system is formed from a V-shaped part. However, other forms of retention system are of course possible.

According to a realization, where the channels are delimited by longitudinal walls, the fastening system comprises notches made transversally relative to a longitudinal direction of the arms; the extremities of the walls of the channel to which the branching device is fastened are engaged inside the notches.

The invention also relates to a branching device for at least one cable of a harness located inside a channel of a raceway, characterized in that it comprises:
- at least two arms, substantially parallel to each other, each provided with a fastening system designed to work with the walls of a channel of a raceway so as to immobilize said fastening system relative to said walls,
- a retention system designed to fasten the at least one cable relative to the branching device,
- a connecting bracket connecting the two arms to each other, the retention system is fastened onto the connecting bracket; this retention system is laterally clear so that, in a top view, it is located outside the channel to which the fastening system is likely to be attached.

BRIEF DESCRIPTION OF THE FIGURES

The invention will be better understood after reading the following description and examination of the associated figures. These figures are to given only for the purposes of a non-limiting illustration of the invention. They show:

FIGS. 9a-9b: three-dimensional views of examples of realization of retention devices of known configuration belonging to the branching device according to the invention.

Identical, similar or analogous elements keep the same reference from one figure to the next.

DESCRIPTION OF EMBODIMENTS OF THE INVENTION

Figure 1:
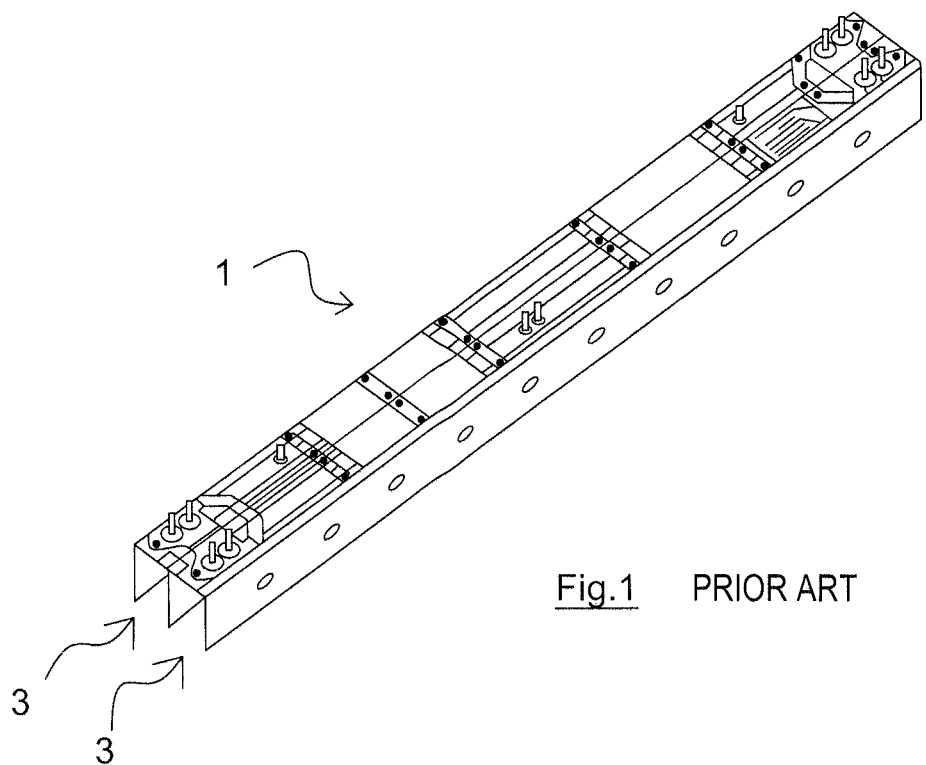
FIG. 1: a three-dimensional view of a single raceway according to the state of the art.
Figure 2:
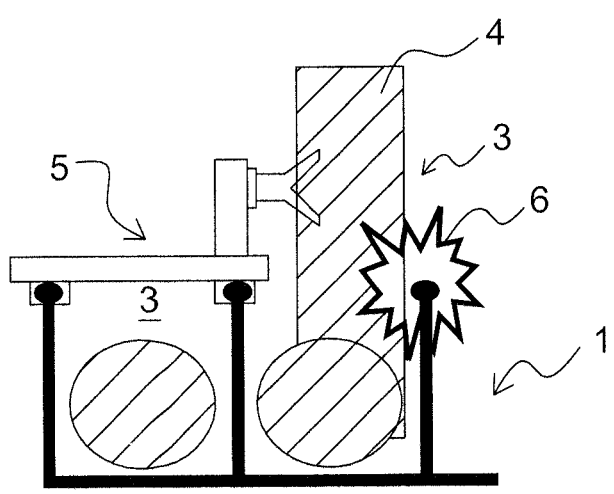
FIG. 2: a transversal cross-section view of a branching device according to the state of the art mounted on a raceway similar to the one in FIG. 1.
Figure 3:
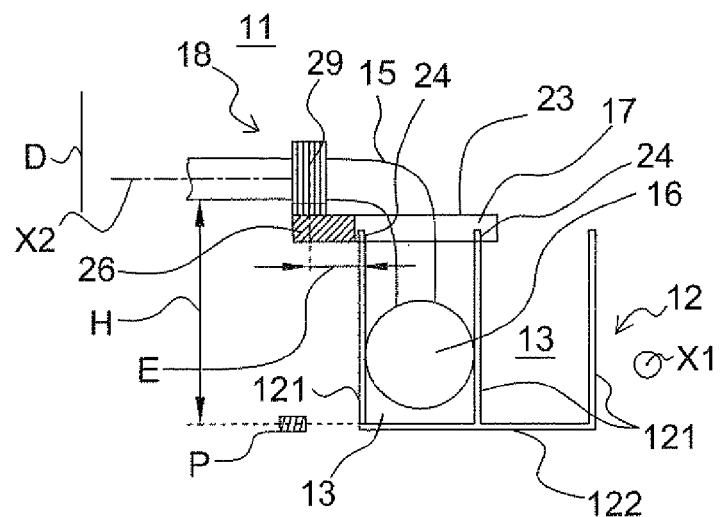
FIGS. 3-5: transversal cross-section, front and top views of a branching device according to the invention installed on a raceway similar to the one in FIG. 1.
Figure 4:
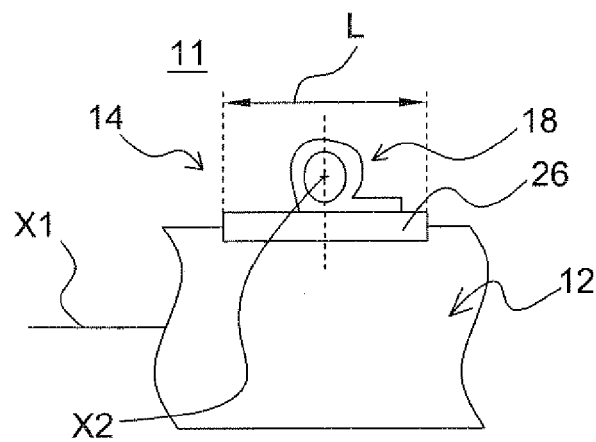
Figure 5:
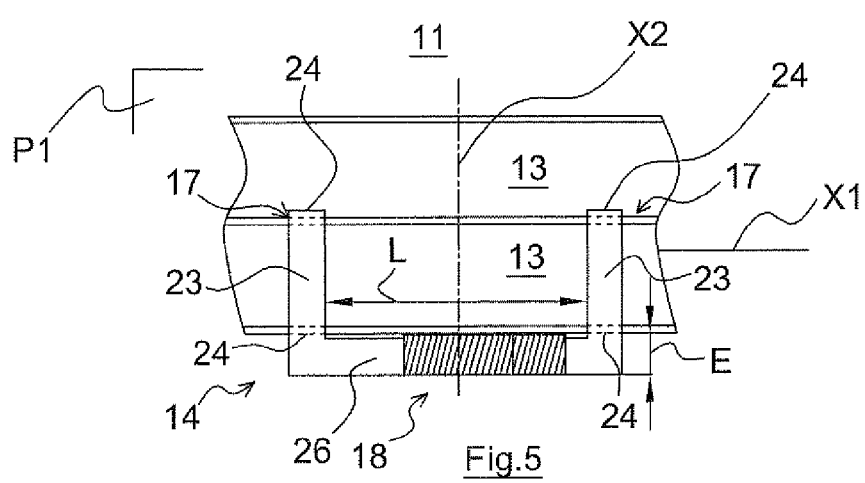

FIGS. 3 to 5 show a raceway 12 comprising channels 13 designed to receive harnesses 16, each formed from one or more bundles of electrical cables. To connect a cable to an electrical device (not shown), it is generally necessary to have a portion of a bundle of the harness taken out of the channel in question. The portion of the bundle located outside the raceway 12 intended to connect the electrical device is here called a "branch". This branch has reference 15 in the figures.

A branching device 14 fastened onto the raceway 12 routes the branch 15 towards the device to be connected, while preventing creating a contact between the branch and the walls of the raceway 12. To this end the branching device 14 comprises a fastening system 17 that allows the device 14 to be fastened on the channel 13, which contains the bundle to which the branch 15 belongs. The device 14 also comprises a retention system 18 allowing the branch 15 to be immobilized relative to the branching device 14. In an example of realization, the branching device 14 is made from a polymer material such as nylon.

More specifically, the raceway 12 is made from a conductive material and comprises walls 121 substantially parallel to each other, connected by one of their edges to a base 122 substantially perpendicular to the walls. The channels 13 are delimited by two successive walls 121 and also by a portion of the base 122 that extends longitudinally between the two walls 121. The raceway 12 and the channels 13 have a direction of elongation referenced X1. The raceway 12 generally comprises two or four channels.

In addition the branching device 14 comprises two arms 23 extending substantially transversally relative to the longitudinal direction X1 of the channel 13. These two arms 23, for example of an elongated parallelepiped shape, are separated from each other by a distance L. These two arms 13 are connected to each other by means of a connecting bracket 26 extending substantially perpendicular to the direction of elongation of the arms 23, in this example along the direction of elongation X1 of the raceway 12. In an example, the connecting bracket 26 also has an elongated parallelepiped shape. The arms 23 are equipped with the fastening system 17 formed, for example, from notches 24 inside which the free edges of the walls 121 are engaged. To this end, the notches 24 are made transversally relative to a longitudinal direction of the arms 23 and the notches 24 have a profile that ensures a non-reversible connection, without tools, by clipping in the free edges of the walls.

Figure 8:
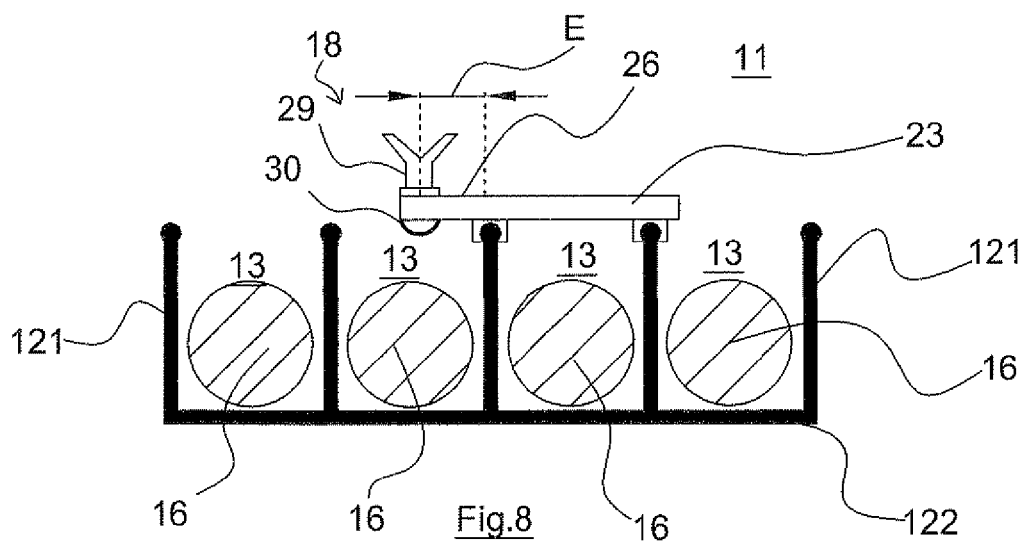
FIG. 8: a side view of the branching device according to the invention comprising a protective device covering a bolt connecting the retention system and the connecting bracket.

The connecting bracket 26 has an offset of dimension E, measured in a direction transversal to the direction of elongation X1 of the channel 13, less than the width of a channel 13, such that it does not interfere with the harness located in an adjacent channel 13 or hamper access to this harness (see FIG. 8). "Adjacent channel to a given channel" means a channel having a common wall 121 with the given channel.

It is noted that the gap L between the two arms 23 preferably depends on the diameter of the branch 15 in order to take into account the rigidity of the branch and the minimum radii of curvature imposed by these rigidities. Thus, for branch diameters less than 15 mm, the gap L between the two arms 23 is 50 mm; for branch diameters from 15 to 30 mm, the gap L between the two arms 23 is 100 mm; for branch diameters from 30 to 45 mm, the gap L between the two arms 23 is 150 mm.

The retention system 18 is laterally clear relative to the channel 13 to which the fastening system 17 is attached. "Laterally clear relative to the channel" means that the geometric projection P of the retention system 18 on the base of the raceway 12 (or in the plane containing the base) in a direction D perpendicular to the base 122, thus in a top view as in FIG. 5, is located outside the channel 13 to which the fastening system 17 is attached. In the embodiment shown, the retention system 18 has an axis X2 perpendicular to the longitudinal direction X1 of the raceway 12 and in a horizontal plane P1 parallel to the directions of elongation of the arms 23 and bracket 26 of the branching device 14.

The retention system 18 is formed, for example, from an open clamping ring 181 shown in FIG. 9a having, at the opening of the ring, two flanges 182, 183 opposite each other. These two flanges 182, 183 extend substantially radially and axially relative to the axis of symmetry X2 when these flanges 182, 183 are pressed together. These flanges 182, 183 can be tightened against each other by means of a tightening system (not shown) in order to keep the closed ring 181 in position around the bundle. When the tightening system is loosened, the flanges 182, 183 can be separated from each other to allow the cable of the branch 15 to be positioned inside the ring 181. The retention system 18 is mounted so as be able to orient the axis of symmetry X2 on the connecting bracket 26 around an axis X3 substantially perpendicular to plane P1 before being immobilized around this axis.

In a variant, as shown in FIG. 9b, the retention device 18 comprises two surfaces 185, 186 inclined with respect to each other so as to present a V-shape. The cable is intended to rest in the hollow of the V, located on the side of the surface of the connecting bracket 26 turned to the opposite side of the raceway 12, in which it is held by a strap or binding band. As previously, the retention device 18 is preferably mounted so as to be orientable on the connecting bracket 26 around an axis X3 substantially perpendicular to plane P1 (i.e. in the plane of the sheet in FIG. 5) so as to be able to be immobilized in the desired direction of the axis X2.

Other known types of retention devices can be used provided they are able to keep the branch immobilized relative to the branching device.

According to a realization shown in FIG. 8, the retention system 18 is connected to the connecting bracket 26 via a through-bolt 29. The retention system 18 comprises a protective device 30 covering one extremity of a bolt emerging from the side of the channel adjacent to the channel containing the cable of the branch 15. This prevents a cable of the channel above which the retention system 18 is positioned from being damaged if an intermittent contact occurs.

Figure 6:
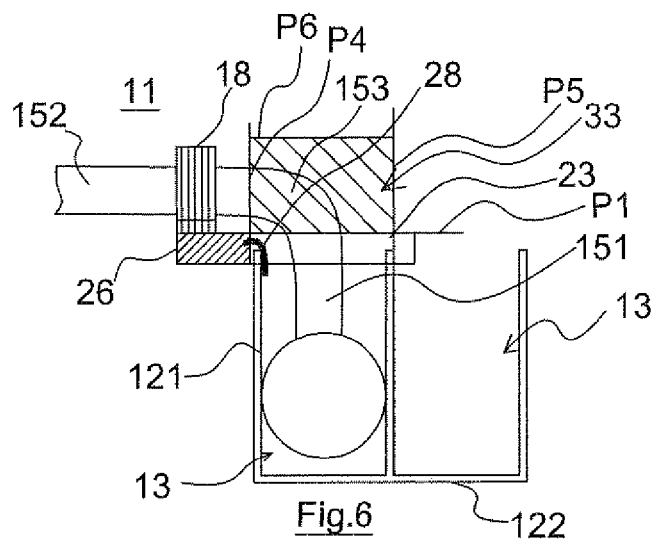
FIGS. 6-7: side and top views of the branching device according to the invention equipped with a protective lip.
Figure 7:
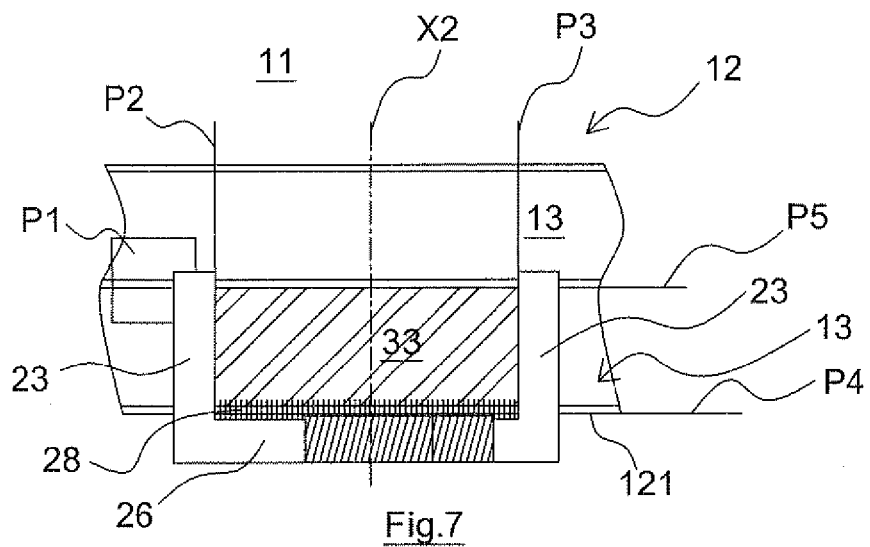

Preferably, as shown in FIGS. 6 and 7, the branching device 14 comprises a protective lip 28 designed to cover the edge of a wall 121 of the channel 13 above which the branch 15 is positioned. The protective lip 28 has the shape, for example, of a thin elongated plate. The protective lip 28 is made of a material making it possible to prevent any damage to the bundles of the branch 15. This plate comprises one of its longitudinal sides fastened onto a side of the connecting bracket 26 facing the raceway 12. The protective lip 28 is folded in the direction of the base 122 of the raceway 12 so as to cover the upper extremity of the wall 121 of the raceway 12.

As shown in more detail in FIGS. 6 and 7, the branching device 14 thus delimits a cross-hatched clearance area 33. More specifically, this clearance area 33 is delimited by the horizontal plane P1; the transverse vertical planes P2 and P3 substantially perpendicular to the base of the raceway 12 passing through the arms 23; the longitudinal transverse planes P4, P5 substantially perpendicular to the base 122 of the raceway 12 passing through the walls 121 of the channel 13 containing the bundle from which the branch 15 comes; and a horizontal plane P6 substantially parallel to plane P1 passing through an extremity of the retention device 18 remote from the base of the raceway 12. This clearance area 33 makes it possible to facilitate the realization of the curvature of the branch 15 for fastening the cable inside the retention device 18.

The installation of the branching device 14 on the raceway 12 so as to immobilize a branch is described below. First of all the arms 23 are fastened onto the walls 121 of the channel 13 containing the cable of the branch 15 to be realized. To this end, pressure is exerted on the arms 23, so that the top of the walls 121 is engaged by force inside notches 24 made in the arms 23. Where necessary, the protective lip 28 is folded to cover the upper extremity of the wall 121 located on the side towards which the cable of the branch 15 is oriented.

Next, the cables of the branch 15 are bent so as to present one portion 151 that extends in the opposite direction to the base 122 so as to bring the branch clear of the raceway 12 and one portion 152 that extends substantially parallel to plane P1 (see FIG. 6). These two portions 151, 152 are connected by a curved part 153 located in the clearance area 33. Portion 152 is positioned inside the retention device 18 oriented along axis X2. In the case where the retention device 18 has the ring shape of FIG. 9a, the portions of the ring 181 are separated to allow the cable to pass inside the ring 181, then the ring's flanges 182, 183 are tightened against each other so as to keep the cable in position. In the case where the retention device 18 has the shape of the part in FIG. 9b, the cable of the branch 15 is positioned in the hollow of the V and immobilized on the part by means of a binding band.

In an example of realization, the notches 24 have dimensions adapted to the dimensions of the walls of the raceway likely to vary according to the type of cable bundles to be protected. Offset E, from the outside edge of the wall 121 closest to the retention system 18 to the axis of the bolt 29 (see FIGS. 3 and 8), is advantageously 25 mm and the distance H, measured vertically between the base of the raceway 12 and the portion of cable 152, is 82 mm, so as to allow a large enough clearance area 33 to prevent any to contact between the branch and the raceway.

In this document, the relative terms of the type "horizontal", "vertical", "upper", "lower" or "above" are understood with reference to a raceway 12 having a base 122 resting directly on a horizontal flat surface such as on a preparation tool or a horizontal surface in an aircraft axis system, or simply on a table in a room.

The invention claimed is:

1. An assembly comprising:
   a raceway comprising one or more channels intended to receive a harness or harnesses comprising bundles of electrical cables, and
   a branching device routing a branch that extends outside the raceway and comes from a bundle located in a channel of the raceway,
   characterized in that the branching device comprises:
   a system for fastening said branching device on the channel containing the bundle from which the branch comes, and
   a retention system immobilizing the branch relative to the branching device; this retention system is laterally clear so that, in a top view, it is located outside the channel to which the fastening system is attached, wherein:
   the branching device comprises two arms separated from each other, equipped with the fastening system, the two arms extending substantially transversally relative to a longitudinal direction of the channel containing the bundle from which the branch comes and being connected to each other by means of a connecting bracket, the retention system being installed on the connecting bracket.

2. The assembly according to claim 1, characterized in that the retention system is positioned above a channel adjacent to the channel on which the branching device is fastened.

3. The assembly according to claim 1, characterized in that when the branching device is fastened onto an end channel of the raceway or onto a raceway with only one channel, the retention system is positioned outside said raceway, seen from above.

4. The assembly according to claim 1, characterized in that a gap between the two arms depends on the diameter of the branch.

5. The assembly according to claim 1, characterized in that the retention system has an axis of symmetry extending in a plane substantially parallel to a base of the raceway.

6. The assembly according to claim 1, characterized in that the branching device also comprises a protective lip designed to cover the edge of a wall of a channel substantially over a length separating the arms.

7. The assembly according to claim 1, characterized in that, where the retention system is connected to the connecting bracket via a through-bolt, it comprises a protective device covering one extremity of the bolt so as to avoid damaging a cable of a bundle in the channel above which the branching device is positioned.

8. The assembly according to claim 1, characterized in that, where the channels are delimited by longitudinal walls, the fastening system comprises notches made transversally relative to a longitudinal direction of the arms; the extremities of the walls of the channel to which the branching device is fastened are engaged inside the notches.

9. Branching device for at least one cable of a harness located inside a channel of a raceway, characterized in that it comprises:

at least two arms, substantially parallel to each other, each provided with a fastening system designed to work with the walls of a channel of a raceway so as to immobilize said fastening system relative to said walls, a retention system designed to fasten the at least one cable relative to the branching device, a connecting bracket connecting the two arms to each other, the retention system is fastened onto the connecting bracket; this retention system is laterally clear so that, in a top view, it is located outside the channel to which the fastening system is likely to be attached.

\* \* \* \* \*